US009111010B2

(12) United States Patent
Dugan et al.

(10) Patent No.: US 9,111,010 B2
(45) Date of Patent: Aug. 18, 2015

(54) SEARCH RESULTS DISPLAY FOR WEIGHTED MULTI-TERM SEARCHES

(75) Inventors: Casey Dugan, Medford, MA (US);
Michael Muller, Medford, MA (US);
Jerry W. Redman, Cedar Park, TX (US); Amy D. Travis, Arlington, MA (US); Sara Weber, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 1702 days.

(21) Appl. No.: 12/347,537

(22) Filed: Dec. 31, 2008

(65) Prior Publication Data

US 2010/0169325 A1    Jul. 1, 2010

(51) Int. Cl.
*G06F 7/00*      (2006.01)
*G06F 17/30*     (2006.01)

(52) U.S. Cl.
CPC .... *G06F 17/30967* (2013.01); *G06F 17/30979* (2013.01)

(58) Field of Classification Search
CPC ............. G06F 17/30979; G06F 17/30967; G06F 17/30648; G06F 17/30864
See application file for complete search history.

(56) References Cited

U.S. PATENT DOCUMENTS

| 5,404,514 | A  | * | 4/1995  | Kageneck et al. ............... 1/1 |
| 5,913,208 | A  | * | 6/1999  | Brown et al. ............. 707/706 |
| 6,067,552 | A  | * | 5/2000  | Yu ............................ 715/234 |
| 6,799,176 | B1 | * | 9/2004  | Page ................................ 1/1 |
| 6,907,552 | B2 | * | 6/2005  | Collins ..................... 714/700 |
| 7,556,384 | B2 | * | 7/2009  | Chan ........................... 353/99 |
| 7,739,264 | B2 | * | 6/2010  | Jones et al. ............... 707/713 |
| 7,779,006 | B2 | * | 8/2010  | Frieder et al. ............. 707/736 |
| 7,818,320 | B2 | * | 10/2010 | Makeev ..................... 707/730 |
| 2003/0088533 | A1 | * | 5/2003 | Fortenberry et al. ........ 706/47 |
| 2006/0212449 | A1 |   | 9/2006 | Novy |
| 2008/0059458 | A1 | * | 3/2008 | Byron ........................... 707/5 |
| 2008/0120295 | A1 | * | 5/2008 | Frieder et al. ................ 707/6 |
| 2009/0254543 | A1 | * | 10/2009 | Ber et al. ..................... 707/5 |

* cited by examiner

*Primary Examiner* — Daniel Kuddus

(74) *Attorney, Agent, or Firm* — Steven M. Greenberg, Esq.; CRGO Law

(57) ABSTRACT

Embodiments of the present invention provide a method, system and computer program product for displaying search results for weighted, multi-term content searches. In an embodiment of the invention, a method for displaying search results for weighted, multi-term content searches is provided. The method includes specifying different weighted search terms for a content search and performing the content search for both content and content meta-data in a search engine. The method also includes retrieving search results for the content search and computing a relevance for each of the weighted search terms. Finally, the method includes presenting both the search results and also a relevance indicator for each computed relevance for each of the weighted search terms found in connection with each of the search results in a user interface to the search engine.

15 Claims, 2 Drawing Sheets

SEARCH RESULTS DISPLAY FOR WEIGHTED MULTI-TERM SEARCHES

BACKGROUND OF THE INVENTION

1. Field of the Invention

The present invention relates to the field of content searching and more particularly to displaying search results for content searches according to multiple different search terms.

2. Description of the Related Art

Content browsing refers to the retrieval and presentation of electronic content in a browser client. Content generally can include electronic documents, messages, audio, audiovisual and video materials and imagery. Most commonly, content can be stored in a server environment and published for access by content consumers over a computer communications network such as the global Internet. Content consumers, in turn, can retrieve content over the network by reference to a network address for the content. Once retrieved, the content can be presented in a browser client including not only conventional visual browsers such as the venerable Web browser, but also in alternative browsers such as those deployed in pervasive devices and those supporting different modes of presentation such as the audible presentation of material.

Given the vast amount of content published for accessibility over the Internet, one cannot enjoy an awareness of a possible content of interest available for access over the Internet. Search engines fill the gap by providing an interface through which end users can instruct searches for documents according to one or more search terms. Basic search engines permit simple term searches where the presence of one or more search terms in content result in the return of a reference to the located content. More sophisticated search engines permit boolean searching and even more sophisticated search engines allow for natural language searching.

Where search terms are provided in a search engine, the results often reflect the relevance of a "hit" based upon a percentage of search terms present in the located content. Yet, in many cases, the search terms provided are not intended to be located in desired content. Rather, search engines frequently permit one to require the omission of any content containing a search term. In boolean terms, the NOT operation is permitted as well as the AND and OR operations. In any event, limiting the end user to providing search terms on an absolute basis of either "is present" or "is absent" reflects the reality that users in many cases lack a familiarity of particular search domain as most searches are ad hoc in nature.

Even still, from time to time users enjoy a substantial understanding of a search domain. In consequence, limiting such users to absolutes can be counterproductive. For example, when searching for content including terms A, B and C, but not D, one may recognized that the search domain of interest, relevant content must include term A, and may terms elements B and C, but should more often than not include term B in respect to term C. Further, relevant content should not include term D usually, but once in a while relevant content may include term D. Conventional search engines cannot support this type of search as a term is either included or excluded in relevant content from the perspective of the conventional search engine. Notwithstanding it would desirable to permit such users to emphasize the importance of one search term over another.

BRIEF SUMMARY OF THE INVENTION

Embodiments of the present invention address deficiencies of the art in respect to content searching and provide a novel and non-obvious method, system and computer program product for displaying search results for weighted, multi-term content searches. In an embodiment of the invention, a method for displaying search results for weighted, multi-term content searches is provided. The method includes specifying different weighted search terms for a content search, and performing the content search for both content and content meta-data in a search engine. The method also includes retrieving search results for the content search and computing a relevance for each of the weighted search terms. Finally, the method includes presenting both the search results and also a relevance indicator for each computed relevance for each of the weighted search terms found in connection with each of the search results in a user interface to the search engine.

In one aspect of the embodiment, the method also can include presenting an iconic representation of confidence for each of the search results. In this regard, the confidence for a search result can reflect a number of bookmarks established for the search result. In another aspect of the embodiment, the method also can include sorting the search results in the user interface according to search results matching user interests of a user requesting the content search, according to search results matching group interests of a group of users associated with the user requesting the content search, according to search results, or according to a least cost of retrieval for content corresponding to the search results. In yet another aspect of the embodiment, a weight applied to each of the search terms can be presented along with the search results and relevance indicator for each computed relevance for each of the weighted search terms found in connection with each of the search results in a user interface to the search engine.

In another embodiment of the invention, a social bookmarking data processing system can be configured for displaying search results for weighted, multi-term content searches. The system can include a social bookmarking system coupled to a data store of social bookmarks and coupled to a plurality of content sources over a computer communications network. The system further can include a multi-term search engine module executing in a computing platform and coupled to the social bookmarking system. The module can include program code enabled to perform a content search for both content and content meta-data according to specified weighted search terms, to retrieve search results for the content search, to compute a relevance for each of the weighted search terms, and to present both the search results and also a relevance indicator for each computed relevance for each of the weighted search terms found in connection with each of the search results in a user interface to the search engine. Optionally, the program code of the module can be further enabled to present an iconic representation of confidence for each of the search results, the confidence for a search result reflecting a number of bookmarks established for a the search result.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for displaying search results for weighted, multi-term content searches. In accordance with an embodiment of the present invention, different search terms can be specified for a search of content and content meta-data. The search terms can be both inclusive and exclusive in that some terms are to be present in located content and content meta-data and other terms are to be absent from located content and content meta-data in order to satisfy the search. The presence of the search terms, however, need not be absolute and can be variable in nature. In this regard, a weight can be applied to one or more of the search terms such that while it may be preferred that the search term is present or absent from located content and content meta-data, as the case may be, it is not required and depending upon the presence or absence of other search terms of more significant weight, located content and content meta-data containing or excluding specified search terms can be returned as part of search results for the search.

In any event, search results can be produced in response to searching content and content meta-data. For each of the results, each search term present in the content or content meta-data can be characterized according to relevance of the respective terms to the result. The relevance can include, by way of example, the presence of the search term in the content or content meta-data adjusted for weight. Further, a confidence can be computed for each search result according to a number of bookmarks applied to the content. Yet further, the search results can be sorted according to criteria such as by user preference, user profile, group profile, or content profile. Finally, the sorted results can be displayed, along with an iconic representation of the characterization for each term for each result, and the computed confidence for each result. Optionally, the weigh applied to any one search term can be displayed along with the iconic representation.

Figure 1A:
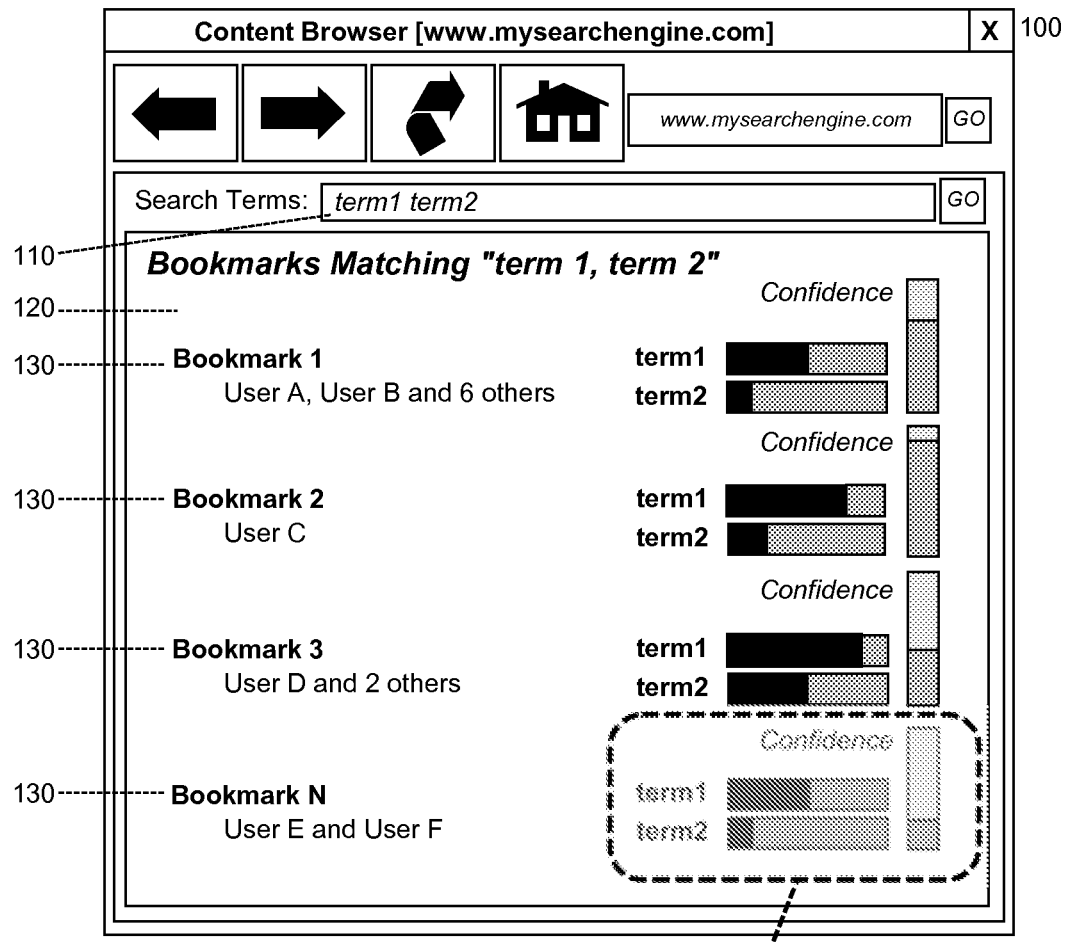
FIGS. 1A and 1B, taken together, are a pictorial illustration of a search engine user interface configured for displaying search results for weighted, multi-term content searches.
Figure 1B:
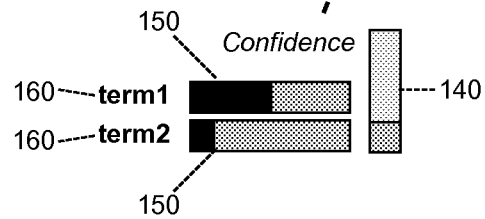

In further illustration, FIGS. 1A and 1B, taken together, pictorially depict a search engine user interface configured for displaying search results for weighted, multi-term content searches. In accordance with FIG. 1A, a content browser 100 can permit the specification of multiple different search terms 110 for searching content and/or content meta-data such as tags applied to the content. Each of the search terms 110 can be weighted according to a user specified weight and can vary from one of the terms 110 to another. In this regard, the search terms can be weighted individually in locating the search results 130, according to well-known techniques such as those described in United States Patent Application Publication No. 2008/0059458 by Robert V. Byron.

Search results 130 meeting the weighted search terms according to the applied weights can be displayed in a results page 120. For instance, as shown in FIG. 1A, a result set of bookmarks to the search results 130 for located content for the search terms 110 can be provided. Alternatively, a reference to located content can be provided in lieu of or in addition to located content for the search terms 110. Importantly, a characterization of each search term can be computed for each of the search results 130 and an iconic representation thereof can be rendered in proximity to each corresponding one of the search results 130.

In illustration, as shown in FIG. 1B, an iconic representation 150 of a characterization of a search term 160 can indicate a relevance of the search term 160 to a corresponding one of the search results 130. The relevance can be computed according to a presence of the search term 160 in the content or content meta-data and a number of appearances of the search term 160 in the content or content meta-data, in both cases weighted according to a weight applied to the search term 160. It is to be noted that the search term 160 need not be present in the content itself, and can be present in the content meta-data such as within tags applied to the content.

Further, as shown in FIG. 1B, an indication of confidence 140 can be visually rendered for each of the search results 130. The indication of confidence 140 can represent a confidence in a corresponding one of the search results 130. The confidence can be computed according to a number of bookmarks having been applied to the content for a corresponding one of the search results 130. Multiple bookmarks having been applied to content indicate a richness amongst opinions by multiple different individuals as to the characterization of content, whilst fewer bookmarks having been applied to content indicate the presence merely of unreliable or unstable opinions by multiple different individuals as to the characterization of content.

Figure 2:
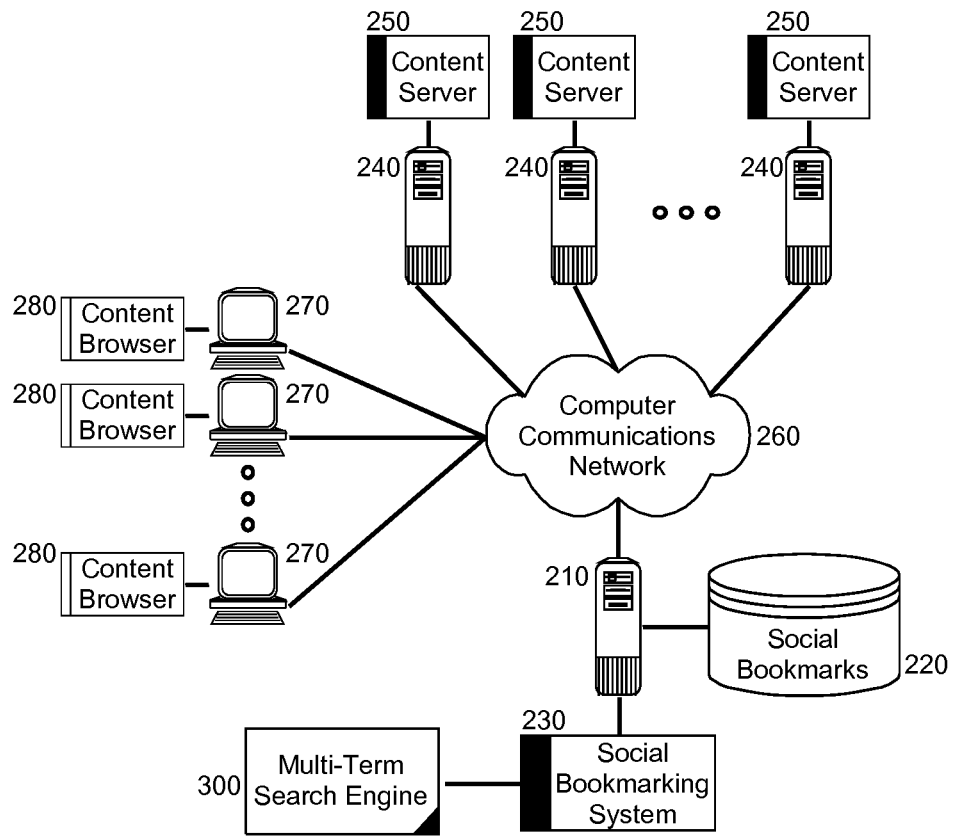
FIG. 2 is a schematic illustration of a social bookmarking data processing system configured for displaying search results for weighted, multi-term content searches.

The search engine user interface described in connection with FIGS. 1A and 1B can be implemented by way of a social bookmarking data processing system. In further illustration, FIG. 2 schematically shows a social bookmarking data processing system configured for displaying search results for weighted, multi-term content searches. The system can include a host computing platform 210 coupled to a data store of social bookmarks 220 and supporting the operation of a social bookmark system 230. The social bookmarking system 230 can be configured to permit access to the data store of social bookmarks 220 in order to search, add and remove social bookmarks therefrom.

The host computing platform 210 can be coupled to different content servers 250 executing in different computing devices 240 over computer communications network 260. Each of the content servers 250 can serve content to requesting content browsers 260 executing in different computers 270 over computer communications network. The content can be textual in nature, imagery, audio, video or audio-visual material, by way of example. Optionally, content meta-data can be associated with the content, such as one or more tags.

Bookmarks can be applied to content served by content servers 250 within social bookmarking system 230 and stored by social bookmarking system 230 in the data store of social bookmarks 220. In this regard, content served by content servers 250 can have associated therewith in the data store of social bookmarks 220, bookmarks applied by different end users accessing the content. The bookmarks in the data store of social bookmarks 220 can include a description of underlying content and a network address such as a uniform resource locator (URL) to the underlying content. Each of the bookmarks in the data store of social bookmarks 220 further can include associated therewith an identification of an end user applying the bookmark to underlying content.

In accordance with an embodiment of the invention, a multi-term search engine module 300 can be coupled to the social bookmarking system 230. The multi-term search engine module 300 can include program code enabled to search content and content meta-data for the content served by the content servers 250 according to weighted search terms provided through a user interface to the multi-term search engine module 300 in order to produce a result set. The program code of the multi-term search engine module 300 further can be enabled to compute and render a characterization of each of the search terms in association with a corresponding result in the result set. The characterization for a search term for a result in the result set can indicate a relevance of the search term with respect to the result—for instance a number of appearances of the search term in the result.

Even further, the program code of the multi-term search engine module 300 can include an indication of confidence for each result in the result set. The indication of confidence can be an iconic representation of a computed value for a number of bookmarks applied to content for the result. Finally, the program code of the multi-term search engine module 300 can be enabled to sort the result set according to criteria based upon, for instance, a user preference, a priori known or computed interests based upon the recorded behavior of an end user corresponding to the content of the result set, known interests of a group of users corresponding to the content of the result set, or a profile of the content of the result set itself such as a cost to retrieve the content.

Figure 3:
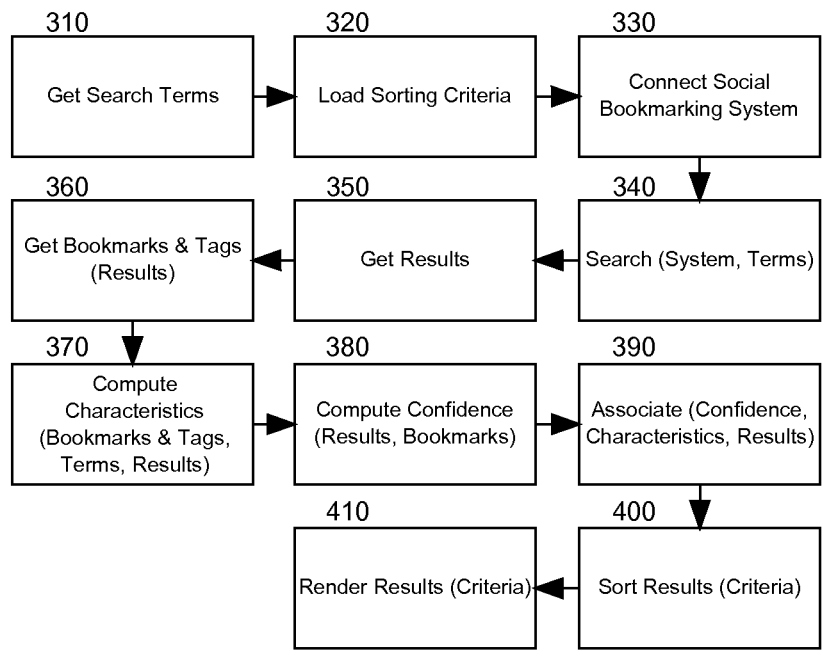
FIG. 3 is a flow chart illustrating a process for displaying search results for weighted, multi-term content searches.

In even yet further illustration of the operation of the multi-term search engine 300, FIG. 3 is a flow chart illustrating a process for displaying search results for weighted, multi-term content searches. Beginning in block 310, multiple different search terms can be received for searching content and content meta-data. In block 320, sorting criteria can be determined and block 330 a connection can be established to a social bookmarking system managing bookmarks to the content. In block 340, a search of the content can be conducted according to the search terms. In particular, the search can be conducted by applying weights to different ones of the search terms so as to emphasize the importance of one of the search terms in respect to others of the search terms.

In block 350, a result set can be produced for the search and in block 360, bookmarks and tags associated with the result set can be retrieved. Thereafter, in block 370 characteristics of each of the search terms with respect to each of result in the result set can be computed—namely a relevance of each of the search terms to each of result in the results set. Likewise, in block 380 a confidence can be computed for each result in the result set by evaluating a number of bookmarks established for each result, a greater number of bookmarks for a result comparing to a higher confidence than that of a lower number of bookmarks. In block 390, the computed confidence and characterizations can be associated with respective ones of the results in the result set.

Finally, in block 400 the results in the result set can be sorted according to criteria based upon, for instance, a user preference, known interests of an end user corresponding to the content of the result set, known interests of a group of users corresponding to the content of the result set, or a profile of the content of the result set itself such as a cost to retrieve the content. Subsequently, in block 410 the results in the result set can be rendered for viewing by an end user.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for displaying search results for weighted, multi-term content searches, the method comprising:
   specifying a plurality of weighted search terms for a content search;
   performing the content search for both content and content meta-data in a search engine;
   retrieving search results for the content search;
   computing a relevance for each of the weighted search terms; and,
   presenting both the search results and also a relevance indicator for each computed relevance for each of the weighted search terms found in connection with each of the search results in a user interface to the search engine.

2. The method of claim 1, further comprising presenting an iconic representation of confidence for each of the search results, the confidence for a search result reflecting a number of bookmarks established for a the search result.

3. The method of claim 1, further comprising, sorting the search results in the user interface according to search results matching user interests of a user requesting the content search.

4. The method of claim 1, further comprising, sorting the search results in the user interface according to search results matching group interests of a group of users associated with the user requesting the content search.

5. The method of claim 1, further comprising, sorting the search results in the user interface according to search results according to a least cost of retrieval for content corresponding to the search results.

6. The method of claim 1, wherein presenting both the search results and also a relevance indicator for each computed relevance for each of the weighted search terms found in connection with each of the search results in a user interface to the search engine, comprises presenting both the search results and also a relevance indicator for each computed relevance for each of the weighted search terms found in connection with each of the search results in a user interface to the search engine, and also each weight applied to each of the search terms.

7. A social bookmarking data processing system configured for displaying search results for weighted, multi-term content searches, the system comprising:
   a hardware processor and memory;
   a social bookmarking system coupled to a data store of social bookmarks and coupled to a plurality of content sources over a computer communications network;
   a multi-term search engine module executing by the hardware processor and memory in a computing platform and coupled to the social bookmarking system, the module comprising program code enabled to perform a content search for both content and content meta-data according to specified weighted search terms, to retrieve search results for the content search, to compute a relevance for each of the weighted search terms, and to present both the search results and also a relevance indicator for each computed relevance for each of the weighted search terms found in connection with each of the search results in a user interface to the search engine.

8. The system of claim 7, wherein the program code of the module is further enabled to present an iconic representation of confidence for each of the search results, the confidence for a search result reflecting a number of bookmarks established for a the search result.

9. The system of claim 7, wherein the program code of the module is further enabled to sort the search results in the user interface according to search results matching user interests of a user requesting the content search.

10. A computer program product comprising a non-transitory computer usable storage medium storing computer usable program code for displaying search results for weighted, multi-term content searches, the computer program product comprising:

computer usable program code for specifying a plurality of weighted search terms for a content search;
computer usable program code for performing the content search for both content and content meta-data in a search engine;
computer usable program code for retrieving search results for the content search;
computer usable program code for computing a relevance for each of the weighted search terms; and,
computer usable program code for presenting both the search results and also a relevance indicator for each computed relevance for each of the weighted search terms found in connection with each of the search results in a user interface to the search engine.

11. The computer program product of claim 10, further comprising computer usable program code for presenting an iconic representation of confidence for each of the search results, the confidence for a search result reflecting a number of bookmarks established for a the search result.

12. The computer program product of claim 10, further comprising, computer usable program code for sorting the search results in the user interface according to search results matching user interests of a user requesting the content search.

13. The computer program product of claim 10, further comprising, computer usable program code for sorting the search results in the user interface according to search results matching group interests of a group of users associated with the user requesting the content search.

14. The computer program product of claim 10, further comprising, computer usable program code for sorting the search results in the user interface according to search results according to a least cost of retrieval for content corresponding to the search results.

15. The computer program product of claim 10, wherein the computer usable program code for presenting both the search results and also a relevance indicator for each computed relevance for each of the weighted search terms found in connection with each of the search results in a user interface to the search engine, comprises computer usable program code for presenting both the search results and also a relevance indicator for each computed relevance for each of the weighted search terms found in connection with each of the search results in a user interface to the search engine, and also each weight applied to each of the search terms.

* * * * *